(12) United States Patent
Tessier, Jr. et al.

(10) Patent No.: US 6,366,768 B1
(45) Date of Patent: Apr. 2, 2002

(54) CIRCUIT AND METHOD OF FREQUENCY SYNTHESIZER CONTROL WITH A SERIAL PERIPHERAL INTERFACE

(75) Inventors: Jesse N. Tessier, Jr., Chandler, AZ (US); Steven Torp, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/188,266

(22) Filed: Nov. 9, 1998

(51) Int. Cl.[7] .................................................. H04B 7/00
(52) U.S. Cl. .................. 455/260; 455/183.1; 455/183.2
(58) Field of Search ........................... 455/76, 260, 343, 455/183.1, 165.1; 331/16, 1 A; 327/105, 156; 370/343, 344; 375/377

(56) References Cited

U.S. PATENT DOCUMENTS 5,335,365 A * 8/1994 Ballantyne et al. ......... 455/260
5,526,527 A * 6/1996 Lipowski et al. ......... 455/183.1
5,552,749 A * 9/1996 Nowatski et al. ........... 455/260
5,999,830 A * 12/1999 Taniguchi et al. .......... 455/574
6,084,448 A * 7/2000 Koszarsky .................. 327/156
6,173,025 B1 * 1/2001 Jokura ........................ 375/376

* cited by examiner

Primary Examiner—Duc Nguyen
Assistant Examiner—Melur Ramakrishnaiah
(74) Attorney, Agent, or Firm—Mark J. Fink

(57) ABSTRACT

A remote wireless communication device (10) receives messages during windows occurring at predetermined intervals as determined by a communication protocol. The remote wireless communication device uses a microcontroller (28) to initialize the functional blocks (18, 20) and perform message and error processing. The microprocessor and most other functional blocks are disabled between receive message windows to conserve power. A frequency synthesizer control function is incorporated with a serial peripheral interface (38) to the frequency synthesizer to enable the frequency synthesizer just prior and during to the receive message window. The frequency synthesizer control saves power by providing the control necessary to monitor for messages during the window without activating the microcontroller.

15 Claims, 1 Drawing Sheet

CIRCUIT AND METHOD OF FREQUENCY SYNTHESIZER CONTROL WITH A SERIAL PERIPHERAL INTERFACE

BACKGROUND OF THE INVENTION

The present invention relates in general to electronic remote wireless communication devices and, more particularly, to a frequency synthesizer controller incorporated with a serial peripheral interface.

In wireless communications, for example using pagers, cellular phones, and two-way radios, messages are transmitted between a base station and a remote unit, or between two or more remote units. In a pager application, the base station transmits a message to the pager. The pager notifies the user that a message has been received and upon user command displays the message on a display screen.

A typical configuration of a remote wireless communication device, e.g. a pager, includes a receiver section for receiving, downconverting, and demodulating the transmitted message to baseband data. The pager must operate over a variety of transmission frequencies as it roams from one operating area to another. Consequently, the receiver section uses a frequency synthesizer to programmably set the reference frequency to the receiver section. A central processing unit (CPU) or other microcontroller with associated memory communicates over a peripheral bus through a serial peripheral interface (SPI) to a message control block. The message control block receives messages from the receiver section. The message control block passes the messages through the SPI to the CPU for processing and display. The CPU also communicates over the peripheral bus through another SPI to enable, disable, and set the operating frequency of the frequency synthesizer. A system clock generator using a phase lock loop (PLL) provides system clock signals to operate the pager.

Most if not all pagers receive operating power from a battery source. Power conservation is an important design consideration to maximize battery life. In the prior art, the message control block is initialized to have prior knowledge of the communication protocol in effect for the present operating or roaming area. According to the communication protocol, the pager receives messages during a narrow predefined window reoccurring at a known cycle. The receive message window reoccurs at a rate ranging between about every two seconds to about every four minutes. The CPU, memory, PLL, SPI, message control block, frequency synthesizer, and receiver section are operating during the window in order to monitor, receive, and process any messages. After the receive message window, the CPU, memory, PLL, SPI, frequency synthesizer, and receiver section are typically disabled or put to sleep to conserve power. The message control block remains active to maintain timing of the arrival of the receive message windows. Just prior to the receive message window, the message control block sends an interrupt via an interrupt controller to awake the CPU, memory, PLL, and SPI blocks. The CPU sends commands via the SPIs to enable the frequency synthesizer and receiver section to be ready for any incoming messages.

Considerable power is required to awaken and operate the CPU, memory, PLL, SPI, frequency synthesizer, and receiver section to monitor for received messages, especially for communication protocols that use frequent receive message windows, e.g. every two seconds.

Thus, there is a need to reduce power consumption in remote wireless communication devices during times of monitoring for incoming communications.

DETAILED DESCRIPTION OF THE PREFERRED EMBODIMENT

Figure 1:
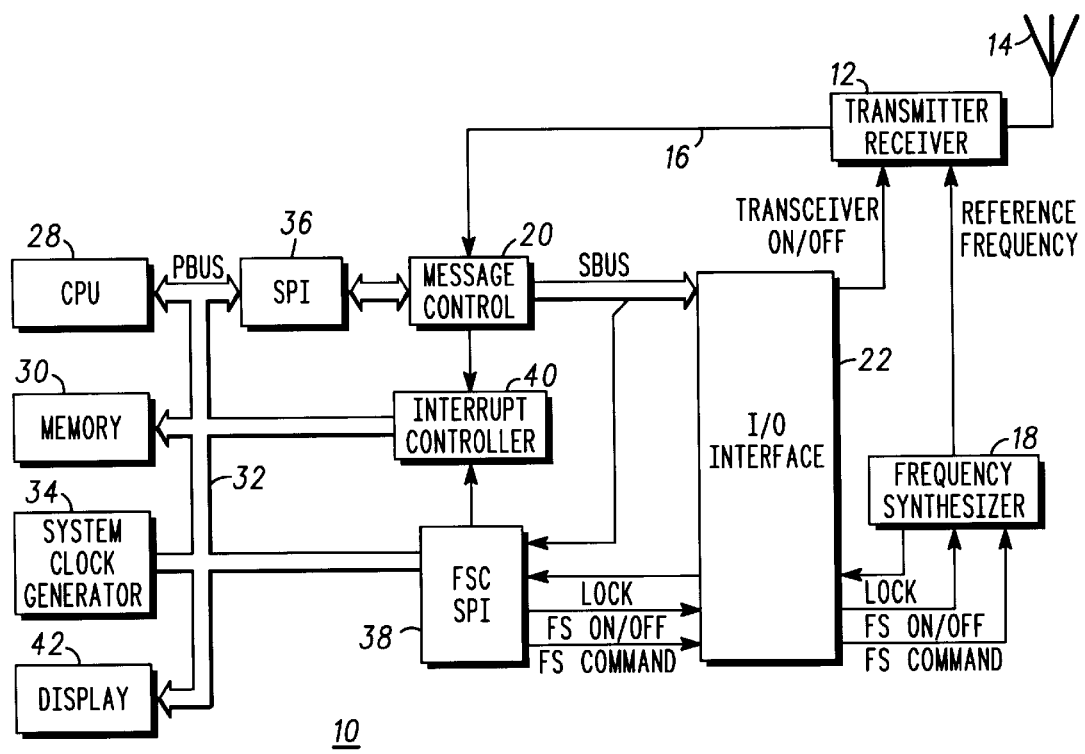
FIG. 1 illustrates a block diagram of a remote wireless communication device.

Referring to FIG. 1, a block diagram of a remote wireless communication device 10 is shown for implementation as an integrated circuit using conventional integrated circuit processes. The remote wireless communication device may be included within a pager, a cellular phone, two-way radio, or other communication device. Remote wireless communication device 10 receives its operating power from a battery source (not shown). Transmitter/receiver 12 receives and transmits messages via antenna 14. Transceiver 12 downconverts and demodulates the incoming messages according to a reference frequency to provide baseband data on channel 16. A programmable frequency synthesizer 18 provides the reference frequency to transceiver 12. Frequency synthesizer 18 has terminals for receiving operating frequency commands and enable/disable commands, and providing PLL lock status. Frequency synthesizer 18 is implemented as a PLL and provides status signals such as a lock detect signal.

The baseband data is routed to an input of message control block 20. An output of message control circuit block 20 is the SBUS (status and control bus) which provides control and command signals to I/O interface 22. I/O interface 22 comprises a plurality of bi-directional registers and/or pass-through buffers to send and receive the control and command signals. One of the command signals from message control block 20 is a TRANSCEIVER ON/OFF control signal which is coupled through I/O interface 22 to transceiver 12. A first value of the TRANSCEIVER ON/OFF control signal enables transceiver 12, and a second value of the TRANSCEIVER ON/OFF control signal disables transceiver 12.

CPU 28 or other microcontroller is the main controller for remote wireless communication device 10. CPU 28 interacts with memory 30 over a peripheral bus (PBUS) to store and retrieve data, commands, and instructions. Memory 30 is implemented as a RAM, ROM, or other suitable storage device. System clock generator 34 uses a PLL to provides system clock signals for remote wireless communication device 10.

To initialize remote wireless communication device 10 when it is turned-on or enters a new roaming area, CPU 28 retrieves commands and instructions from memory 30 over the PBUS. The commands and instructions are sent to message control block 20 by way of serial peripheral interface (SPI) 36. SPI 36 is full duplex and includes transmit data registers, receive data registers, and control registers. The transmit and receive data registers are configured as write only to transmit data or read only to receive data. The control registers (i) control the polarity and phasing of the clock, (ii) enable the transmit protocol to be master or slave, (iii) configure operating protocol (e.g. CPU interrupt), (iv) handle handshaking (e.g. transmitter empty, receiver full), and (v) handle error processing. Message control block 20 is configured according to the message protocol defined for the present roaming area. In one example, the message protocol defines windows during which messages may be received by transceiver 12. The receive message window occurs for a variable duration as necessary to check for incoming messages and repeats up to every two seconds. The initialization sequence or process also sets the reference frequency for frequency synthesizer 18. CPU 28 sends a command (FS COMMAND) by way of SPI 38 to frequency synthesizer 18. The FS COMMAND is stored in frequency synthesizer 18 and sets the reference frequency to transceiver 12 according to the roaming area. Once the initialization sequence is complete, all components of remote wireless communication device 10 (other than message control block 20), i.e. CPU 28, memory 30, PBUS, system clock generator 34, SPI 36, frequency synthesizer 18, and transceiver 12, are put to sleep or otherwise disabled to reduce power consumption. Message control block 20 remains active to keep track of timing according to the message protocol as initialized by CPU 28.

Portions of remote wireless communication device 10 must be awakened or otherwise enabled to monitor for messages during the receive message window. However, in order to minimize power consumption, it is desirable to reduce the portions of remote wireless communication device 10 that are operating during the receive message window.

The present invention includes a frequency synthesizer controller (FSC) incorporated with SPI 38 to generate a FS ON/OFF command to enable and disable frequency synthesizer 18. Just prior to the receive message window, message control block 20 sends a command to FSC SPI 38 over the SBUS. FSC SPI 38 generates the FS ON/OFF command, including data, clock, and strobe signals, from internal registers and routes the FS ON/OFF command through I/O interface 22 to frequency synthesizer 18. The FS ON/OFF command enables frequency synthesizer 18 to provide the pre-programmed reference frequency to transceiver 12 for the duration of the receive message window. After lock should have been achieved, FSC SPI 38 passes the PLL lock status request through I/O interface 22 to frequency synthesizer 18 which in turn provides a LOCK status signal back through I/O interface 22 to FSC SPI 38 indicating whether or not the frequency synthesizer PLL is fully operational and locked onto the desired frequency. For a situation where frequency synthesizer 18 does not achieve phase lock, the LOCK status signal causes FSC SPI 38 to send a lock detection error signal to interrupt controller 40, which in turn generates an error interrupt to activate CPU 28. CPU 28 interfaces through SPI 38 to attempt an error recovery of frequency synthesizer 18 and, if unsuccessful, provide a system error message to the user on display 42. The error recovery involves attempting to reset the operation and frequency of frequency synthesizer 18 and establish phase lock.

Message control block 20 also sends the TRANSCEIVER ON/OFF commands to enable transceiver 12. Transceiver 12 and frequency synthesizer 18 are operating by the start of the receive message window. If any message is received, it is downconverted and demodulated to baseband data and placed on channel 16. Message control block 20 monitors channel 16 for any received message. When a message is received during the window, message control block 20 generates an interrupt to interrupt controller 40, which in turn activates CPU 28, memory 30, PBUS, SPI 36, and system clock generator 34 to process the message. The message is sent to CPU 28 by way of SPI 36 and ultimately presented on display 42 of remote wireless communication device 10.

After the receive message window, message control block 20 sends a TRANSCEIVER ON/OFF command to disable transceiver 12. Message control block 20 also sends a command to FSC SPI 38 over the SBUS to disable frequency synthesizer 18. FSC SPI 38 generates the FS ON/OFF command from internal registers and routes the FS ON/OFF command through I/O interface 22 to frequency synthesizer 18. The FS ON/OFF command disables the reference frequency and powers-down frequency synthesizer 18. During most receive message windows, no message is received. Thus, in most receive message window cycles, i.e. where no message is received, CPU 28, memory 30, PBUS, SPI 36, system clock generator 34, and associated software instructions remain inactive thereby reducing power consumption from the battery source in device 10.

The present invention allows remote wireless communication device 10 to monitor for messages during the receive message window without activating CPU 28, memory 30, PBUS, SPI 36, system clock generator 34, and associated software instructions. These devices draw an appreciable amount of power. It is not necessary to use the computing and processing power of CPU 28, memory 30, PBUS, SPI 36, and system clock generator 34 just to enable frequency synthesizer 18. By providing a frequency synthesizer control function incorporated with the serial peripheral interface in FSC SPI 38, the necessary control over frequency synthesizer 18 is achieved without activating the other components. The other components are activated only when a message is actually received. Remote wireless communication device is able to conserve power and extend battery life by reducing the number of components that are operational during most receive message windows. In applications where the receive message window repeats at a high occurrence, i.e. once every two seconds, the power a savings can be considerable.

Figure 2:
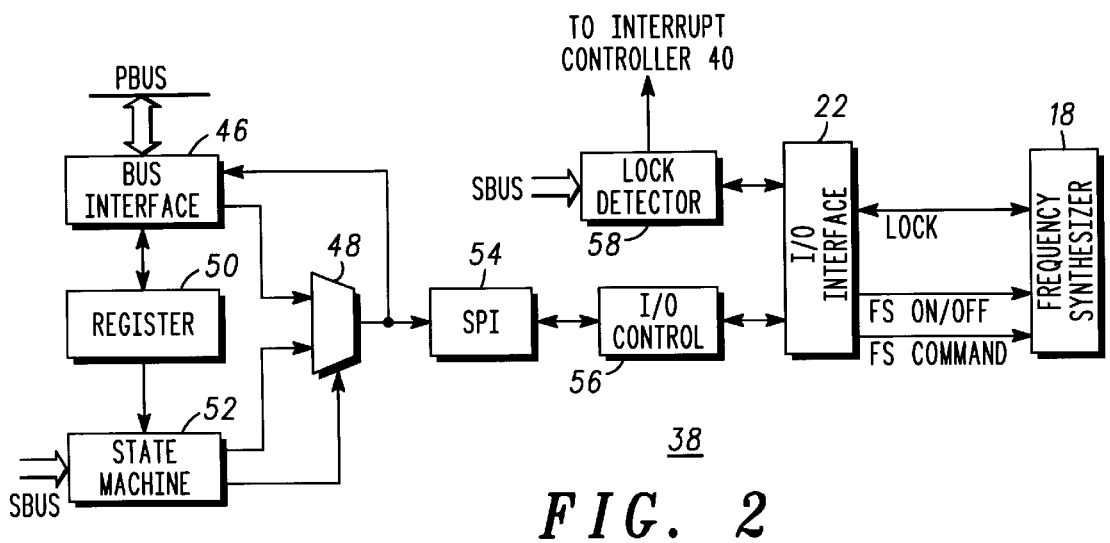
FIG. 2 illustrates further detail of the FSC SPI block of FIG. 1.

Turning to FIG. 2, further detail of FSC SPI 38 is shown including bus interface 46 coupled to the PBUS. Bus interface 46 has an output coupled to a first input of multiplexer 48. Bus interface 46 is also able to load data into register 50. The data in register 50 controls the operation of bus interface 46 and state machine 52 and provides the enable and disable values for the FS ON/OFF command. A first output of state machine 52 is coupled to a second input of multiplexer 48, and a second output of state machine 52 is coupled to a control input of multiplexer 48. The output of multiplexer 48 is coupled to an input of SPI 54 and the output of SPI 54 is coupled to an input of I/O control 56. The output of I/O control 56 is routed through I/O interface 22 to frequency synthesizer 18. The components in FIG. 2 having the same reference numbers used in FIG. 1 provide the same function. Lock detector 58 receives a request from message control block 20 by way of the SBUS. The LOCK status signal from frequency synthesizer 18 is coupled back through I/O interface 22 to lock detector 58, which provides the lock detection error signal to interrupt controller 40 as described above.

The operation of FSC SPI 38 proceeds as follows. Message control block 20 provides a command signal over the SBUS to state machine 52. As described below, state machine 52 controls multiplexer 48 to pass either signals from the PBUS by way of bus interface 46 or signals from state machine 52. During the initialization process, message control block 20 sends the appropriate command to state machine 52 whereby multiplexer 48 passes the signals from bus interface 46. The commands necessary to configure frequency synthesizer 18 are sent by CPU 28 over the PBUS through bus interface 46 and multiplexer 48 to SPI 54. SPI 54 passes the configuration signals FS COMMAND through I/O control 56 and I/O interface 22 to frequency synthesizer 18. The FS COMMAND is stored locally in frequency synthesizer 18 and the reference frequency is thereby set to the desired value.

Frequency synthesizer 18 is also capable of sending status signals and other data back through I/O interface 22 and I/O control 56 to SPI 54. SPI 54 passes the status signals to bus interface 46 to be sent back to CPU 28 or memory 30 over the PBUS.

Just prior to the receive message window, message control block 20 sends a command to state machine 52 which switches control of multiplexer 48 to pass signals from state machine 52. State machine 52 sends the FS ON/OFF command to SPI 54 which passes the command through I/O control 56 and I/O interface 22 to frequency synthesizer 18. Frequency synthesizer 18 enables the pre-programmed reference frequency to transceiver 12 to receive any incoming messages. Message control block 20 triggers a command over the SBUS to check PLL lock status of frequency synthesizer 18. If the frequency synthesizer PLL locks to the reference frequency, the LOCK signal indicates such status to lock detector 58. If the frequency synthesizer PLL fails to lock to the reference frequency, the LOCK signal indicates such failure back to lock detector 58 which causes interrupt controller 40 to generate the appropriate interrupt to CPU 28 for recovery and error processing. Message control block 20 monitors for incoming messages during the receive message window. After the window, message control block 20 sends a command to FSC SPI 38 to disable frequency synthesizer 18 as discussed above.

FSC SPI 38 operates in one of two modes depending on the command signal from message control block 20. In one mode, FSC SPI 38 operates as a serial peripheral interface to pass command signals from CPU 28 to initialize and perform error recovery on frequency synthesizer 18 and receive status signals back. In a second mode, FSC SPI 38 is a frequency synthesizer controller that enables and disables operation of frequency synthesizer 18 and checks for PLL lock status. The frequency synthesizer control allows remote wireless communication device 10 to monitor for any incoming messages during the receive message window without utilizing the full and power consuming processing capabilities of CPU 28 and associated function blocks. CPU 28 is activated only if a message is received. The frequency synthesizer control incorporated with the serial peripheral interface reduces the overall power consumption in remote wireless communication device 10.

State machine 52 utilizes internal logic and control registers to generate the necessary data, address, and control signals to read the FS ON/OFF command signals from register 50 and write them to SPI 54 in response to a command from message control block 20. Upon receiving the command from message control block 20 to enable the FSC function, state machine 52 switches multiplexer 48 to pass signals from the state machine. State machine 52 sends a first portion of the FS ON/OFF control signals to enable frequency synthesizer 18 in a handshaking operation with SPI 54. SPI 54 communicates back to let state machine 52 know when SPI 54 is ready to receive more of the FS ON/OFF control signals. Once the FS ON/OFF control signal is sent, frequency synthesizer 18 becomes fully operational to provide the reference frequency to transceiver 12 during the receive message window. After the receive message window, message control block 20 sends another command to FSC SPI 38 to disable frequency synthesizer 18. State machine 52 generates the FS ON/OFF control signal from internal registers and sends a first portion in a handshaking operation with SPI 54. SPI 54 communicates back to let state machine 52 know when SPI 54 is ready to receive more of the FS ON/OFF control signals. Once the FS ON/OFF control signal is sent, frequency synthesizer 18 is disabled again to conserve power. State machine 52 may switch multiplexer 48 back to passing signals from bus interface 46.

By now it should be appreciated that the present invention provides remote wireless communication device such as a pager that receives messages during windows occurring at predetermined intervals as determined by a communication protocol. The remote wireless communication device uses a microcontroller to initialize the functional blocks and perform message and error processing. The microprocessor and most other functional blocks are disabled between and during receive message windows to conserve power. The full and power consuming processing power of the microcontroller is not needed to monitor for messages for each receive message window. A frequency synthesizer control function is incorporated with a serial peripheral interface to the frequency synthesizer to enable the frequency synthesizer just prior to and during the receive message window. The frequency synthesizer control saves power by providing the control necessary to monitor for messages during the window without activating the microcontroller.

What is claimed is:

1. An integrated circuit, comprising:
   a microcontroller having an output coupled to a bus;
   a message control circuit having a first terminal coupled to the bus, a second terminal coupled for receiving data signals, and a third terminal for providing command signals;
   a frequency synthesizer control circuit having a first terminal coupled to the bus, a second terminal coupled for receiving the command signals from the message control circuit, and a third terminal for providing a frequency synthesizer control signal even when the microcontroller is not powered; and
   a frequency synthesizer that is disabled when the frequency synthesizer control signal has an off state and provides a reference signal when the frequency synthesizer control signal has an on state.

2. The integrated circuit of claim 1 further including a serial peripheral interface circuit having a first terminal coupled to the bus and a second terminal coupled to the first terminal of the message control circuit.

3. The integrated circuit of claim 1 further including:
   a receiver having an input coupled for receiving transmitted data and an output coupled to the second terminal of the message control circuit.

4. The integrated circuit of claim 3 wherein the frequency synthesizer control circuit further includes a lock detector circuit coupled to a second output of the frequency synthesizer.

5. An integrated circuit, comprising:
   a microcontroller having an output coupled to a bus;
   a message control circuit having a first terminal coupled to the bus, a second terminal coupled for receiving data signals, and a third terminal for providing command signals;
   a frequency synthesizer control circuit having a first terminal coupled to the bus, a second terminal coupled for receiving the command signals from the message control circuit, and a third terminal for providing a frequency synthesizer control signal; and
   a frequency synthesizer that is disabled when the frequency synthesizer control signal has an off state and provides a reference signal when the frequency synthesizer control signal has an on state;

wherein the frequency synthesizer control circuit includes:
- a state machine having an input coupled for receiving the command signals from the message control circuit; and
- a multiplexer having a first input coupled to the bus, a second input coupled to a first output of the state machine, a control input coupled to a second output of the state machine, and an output coupled to the third terminal of the frequency synthesizer control circuit.

6. The integrated circuit of claim 5 wherein the frequency synthesizer control circuit further includes a serial peripheral interface circuit having a first terminal coupled to the output of the multiplexer and a second terminal coupled to the third terminal of the frequency synthesizer control circuit.

7. The integrated circuit of claim 6 wherein the frequency synthesizer control circuit further includes an I/O interface circuit having a first terminal coupled to the second terminal of the serial peripheral interface circuit and a second terminal coupled to the third terminal of the frequency synthesizer control circuit.

8. The integrated circuit of claim 7 wherein the frequency synthesizer control circuit further includes a bus interface circuit coupled between the bus and the first input of the multiplexer.

9. A wireless communication device, comprising:
- a receiver having an input coupled for receiving transmitted data;
- a frequency synthesizer having an output for providing a reference frequency to a control input of the receiver;
- a microcontroller having an output coupled to a bus;
- a message control circuit having a first terminal coupled to the bus, a second terminal coupled for receiving the transmitted data, and a third terminal for providing command signals; and
- a frequency synthesizer control circuit having a first terminal coupled to the bus, a second terminal coupled for receiving the command signals from the message control circuit, and a third terminal for providing, even when the microcontroller is not powered, a frequency synthesizer control signal to an input of the frequency synthesizer that disables the frequency synthesizer when in an off state from providing the reference frequency.

10. The wireless communication device of claim 9 further including a serial peripheral interface circuit having a first terminal coupled to the bus and a second terminal coupled to the first terminal of the message control circuit.

11. The wireless communication device of claim 9 wherein the frequency synthesizer control circuit further includes a lock detector circuit coupled to a second output of the frequency synthesizer.

12. A wireless communication device, comprising:
- a receiver having an input coupled for receiving transmitted data;
- a frequency synthesizer having an output for providing a reference frequency to a control input of the receiver;
- a microcontroller having an output coupled to a bus;
- a message control circuit having a first terminal coupled to the bus, a second terminal coupled for receiving the transmitted data, and a third terminal for providing command signals; and
- a frequency synthesizer control circuit having a first terminal coupled to the bus, a second terminal coupled for receiving the command signals from the message control circuit, and a third terminal for providing a frequency synthesizer control signal to an input of the frequency synthesizer that disables the frequency synthesizer when in an off state from providing the reference frequency;

wherein the frequency synthesizer control circuit includes:
- a state machine having an input coupled for receiving the command signals from the message control circuit; and
- a multiplexer having a first input coupled to the bus, a second input coupled to a first output of the state machine, a control input coupled to a second output of the state machine, and an output coupled to the third terminal of the frequency synthesizer control circuit.

13. The wireless communication device of claim 12 wherein the frequency synthesizer control circuit further includes a serial peripheral interface circuit having a first terminal coupled to the output of the multiplexer and a second terminal coupled to the third terminal of the frequency synthesizer control circuit.

14. The wireless communication device of claim 13 wherein the frequency synthesizer control circuit further includes an I/O interface circuit having a first terminal coupled to the second terminal of the serial peripheral interface circuit and a second terminal coupled to the third terminal of the frequency synthesizer control circuit.

15. The wireless communication device of claim 14 wherein the frequency synthesizer control circuit further includes a bus interface circuit coupled between the bus and the first input of the multiplexer.

* * * * *